(12) United States Patent
Asplund et al.

(10) Patent No.: US 12,494,949 B2
(45) Date of Patent: Dec. 9, 2025

(54) NODE AND METHOD FOR ADJUSTING CHANNEL COEFFICIENTS OF A WIRELESS CHANNEL

(71) Applicant: Telefonaktiebolaget LM Ericsson (publ), Stockholm (SE)

(72) Inventors: Henrik Asplund, Stockholm (SE); Magnus Thurfjell, Luleå (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 18/290,716

(22) PCT Filed: Aug. 10, 2021

(86) PCT No.: PCT/SE2021/050784
§ 371 (c)(1),
(2) Date: Jan. 19, 2024

(87) PCT Pub. No.: WO2023/018362
PCT Pub. Date: Feb. 16, 2023

(65) Prior Publication Data
US 2025/0097077 A1   Mar. 20, 2025

(51) Int. Cl.
*H04L 25/02* (2006.01)
(52) U.S. Cl.
CPC .................. *H04L 25/022* (2013.01)
(58) Field of Classification Search
CPC . H04L 25/022; H04L 1/0026; H04L 25/0224; H04L 25/021; H04L 25/0212;
(Continued)

(56) References Cited

U.S. PATENT DOCUMENTS 5,459,668 A   10/1995   Dogan et al.
6,232,918 B1   5/2001   Wax et al.
(Continued)

FOREIGN PATENT DOCUMENTS

CN   102544755 A   7/2012
CN   102544755 B   12/2013
(Continued)

OTHER PUBLICATIONS

Becirovic, et al., "Joint Antenna Detection and Bayesian Channel Estimation for Non-Coherent User Terminals," IEEE Transactions on Wireless Communications, vol. 19, Issue 11, Nov. 2020, pp. 7081-7096.
(Continued)

*Primary Examiner* — Khanh C Tran
(74) *Attorney, Agent, or Firm* — Withrow & Terranova, PLLC

(57) ABSTRACT

A method performed by a first node for adjusting channel coefficients of a wireless channel between the first node and a second node in a wireless communications network is provided. The first node obtains a calculated current correlation value between the first channel coefficients estimated in a first time instant, and the second channel coefficients estimated in a second time instant. The second time instant is subsequent to the first time instant. The first node obtains a previous correlation value calculated at a previous time instant. The first node determines a phase adjustment value based on an estimated phase difference to be applied to the estimated second channel coefficients associated with the wireless channel. The phase difference is estimated between the current correlation value and the previous correlation value.

15 Claims, 13 Drawing Sheets

(58) Field of Classification Search
CPC ...... H04B 7/12; H04B 7/0689; H04B 7/0671; H04B 7/0682
See application file for complete search history.

(56) References Cited

U.S. PATENT DOCUMENTS

| | | | |
|---|---|---|---|
| 6,983,127 | B1 | 1/2006 | Da Torre et al. |
| 8,379,745 | B1 | 2/2013 | Nabar et al. |
| 10,985,787 | B1 | 4/2021 | Bloechl et al. |
| 2004/0014431 | A1* | 1/2004 | Lo .................. H04B 7/0669 455/73 |
| 2004/0235433 | A1* | 11/2004 | Hugl ................ H04B 7/0682 455/101 |
| 2005/0047518 | A1* | 3/2005 | Auer ................. H04L 25/022 375/267 |
| 2013/0242761 | A1 | 9/2013 | Park |
| 2015/0304130 | A1 | 10/2015 | Logothetis et al. |
| 2018/0048374 | A1 | 2/2018 | Johansson et al. |
| 2020/0011956 | A1 | 1/2020 | Zarubica et al. |
| 2020/0204002 | A1 | 6/2020 | Hajimiri et al. |
| 2021/0344524 | A1 | 11/2021 | Shikida et al. |

FOREIGN PATENT DOCUMENTS

| | | |
|---|---|---|
| WO | 2016169577 A1 | 10/2016 |
| WO | 2019172412 A1 | 9/2019 |
| WO | 2022010389 A1 | 1/2022 |

OTHER PUBLICATIONS

Glamocic, et al., "Calibration of mmWave Antenna Arrays for Initial Access in Massive MIMO 5G Cellular Networks," 20th International Workshop on Signal Processing Advances in Wireless Communications, 2019, 5 pages.
Swindlehurst, et al., "Multiple invariance ESPRIT," IEEE Transactions on Signal Processing, vol. 40, Issue 4, Apr. 1992, 15 pages.
Vieira, et al., "A Receive/Transmit Calibration Technique based on Mutual Coupling for Massive MIMO Base Stations," International Symposium on Personal, Indoor, and Mobile Radio Communications, 2016, Valencia, Spain, 6 pages.
International Search Report and Written Opinion for International Patent Application No. PCT/SE2020/050712, mailed Apr. 28, 2021, 11 pages.
International Search Report and Written Opinion for International Patent Application No. PCT/SE2021/050784, mailed Apr. 8, 2022, 11 pages.
Extended European Search Report for European Patent Application No. 21953579.6, mailed Mar. 3, 2025, 8 pages.
Dogan, et al., "Applications of Cumulants to Array Processing—Part I: Aperture Extension and Array Calibration," IEEE Transactions on Signal Processing, vol. 43, Issue 5, May 1995, pp. 1200-1216.
Extended European Search Report for European Patent Application No. 20944677.2, mailed Mar. 6, 2024, 8 pages.
Non-Final Office Action for U.S. Appl. No. 18/014,347, mailed Jul. 3, 2024, 6 pages.

* cited by examiner

201. Obtain first channel coefficients associated with the wireless channel. The first channel coefficients is estimated at a first time instant.

202. Obtain second channel coefficients associated with the wireless channel. The second channel coefficients is estimated at a second time instant. The second time instant is subsequent to the first time instant.

203. Obtain a calculated current correlation value between the first channel coefficients estimated in the first time instant and the second channel coefficients estimated in the second time instant.

204. Obtain a previous correlation value calculated at a previous time instant.

205. Estimate a phase difference between the current correlation value and the previous correlation value.

206. Determine a phase adjustment value based on the estimated phase difference to be applied to the estimated second channel coefficients associated with the wireless channel.

207. Apply the phase adjustment value to the estimated second channel coefficients associated with the wireless channel.

Fig. 2

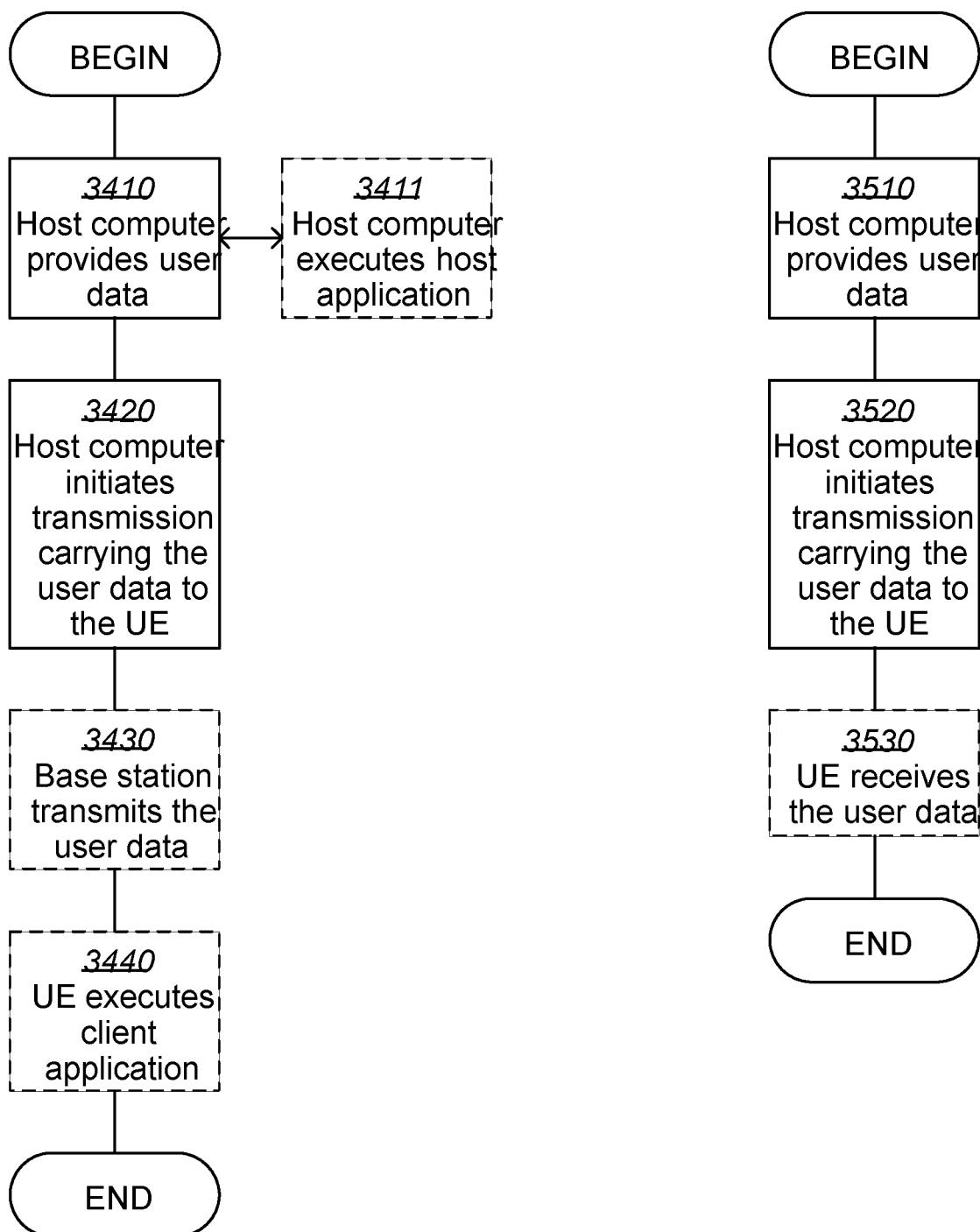

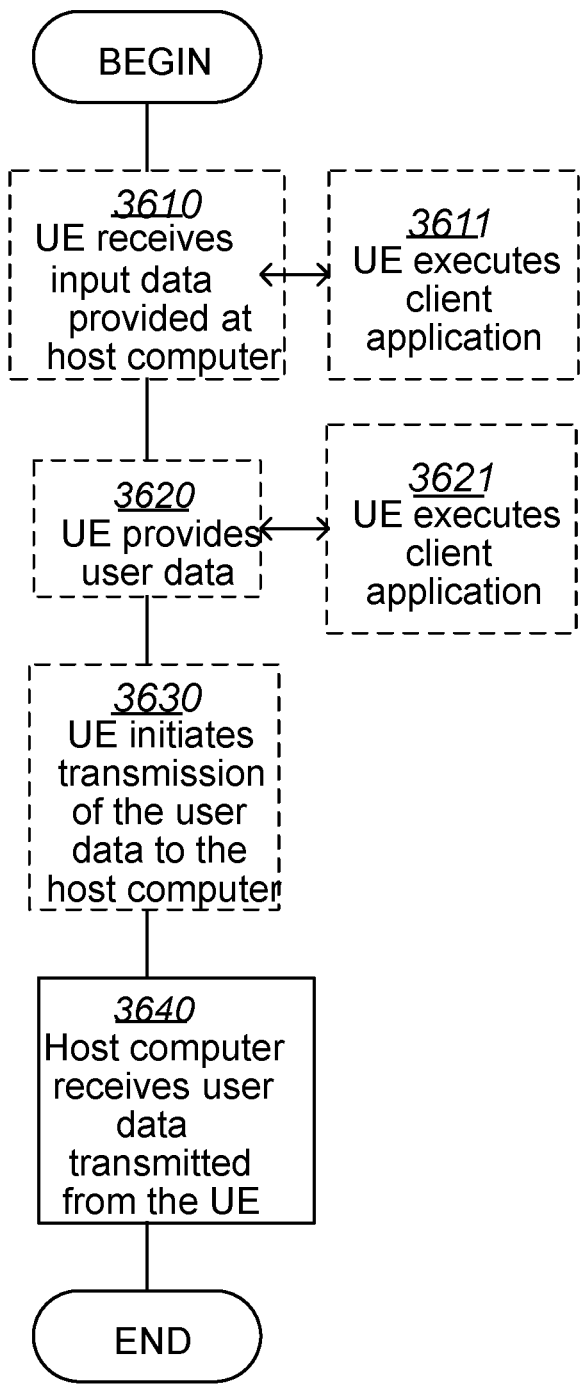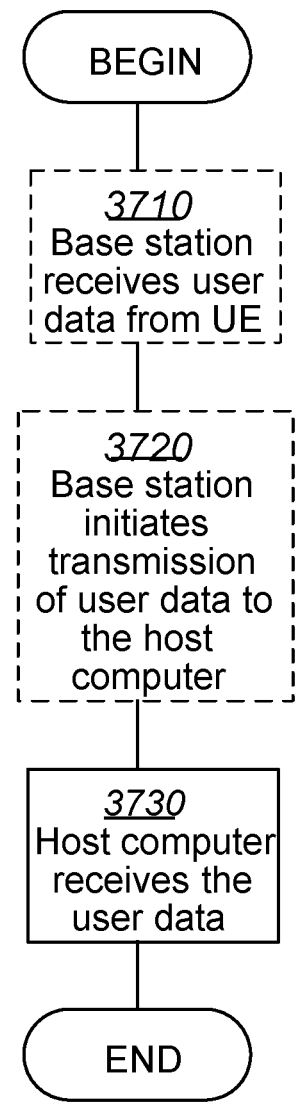
FIG. 14
FIG. 15

NODE AND METHOD FOR ADJUSTING CHANNEL COEFFICIENTS OF A WIRELESS CHANNEL

This application is a 35 U.S.C. § 371 national phase filing of International Application No. PCT/SE2021/050784, filed Aug. 10, 2021, the disclosure of which is incorporated herein by reference in its entirety.

TECHNICAL FIELD

Embodiments herein relate to a first node and a method therein. In some aspects, embodiments herein relate to adjusting channel coefficients of a wireless channel between the first node and a second node in a wireless communications network.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. It should be noted that the receivers may have one or more antennas. Such systems and/or related techniques are commonly referred to as MIMO.

Modern wireless communication systems require some form of channel state information (CSI) to efficiently transmit and receive data over wireless channels. The CSI may contain some information of the wireless channel, such as e.g. average received power, amplitude, and phase as a function of time, frequency, and antenna port, interference level, etc. At a transmitter node, CSI is e.g. used to determine modulation order, coding scheme, beamforming weights, scheduling of transmissions, etc., while at a receiver node, CSI is used to decode data from the modulated radio waves. A very common method for acquiring CSI is to transmit known information symbols, so called reference symbols, that when received it makes it possible to identify and to use to assess how the wireless channel affects the transmissions. One form of this is Sounding Reference Signals (SRS) that are used in the uplink of LTE and NR. SRS transmissions are typically performed at regular intervals in time and frequency and allow a receiver, e.g. a network node such as a base station, to infer how the wireless channel varies in time and frequency. In a common case, where the base station has multiple receive antennas this also allows characterization of how the channel varies over the antennas.

The wireless channel is a superposition of the contributions from a multitude of waves or propagation paths which commonly result in random-like variations, referred to as fast fading, of the channel coefficients. Fast fading e.g. occurs when the coherence time of the channel is small relative to the delay requirement of the application. Coherence time is the duration in which the channel is assumed to be constant or where the channel variations are smaller than some threshold.

In this case, the amplitude and phase change imposed by the channel varies considerably over the period of use. However, there is structure in the channel variations such that neighboring time instants, frequency bins, or antennas, experience correlation in the fading variations.

In reciprocity-based precoding, also referred to as reciprocity-based beamforming, a base station uses the channel estimates on the uplink at a certain time to infer the wireless channel at a subsequent time instant and adjust beamforming weights accordingly.

It is common to aggregate channel estimates over time to improve the estimation quality or even to perform prediction of how the channel will evolve in the near future.

SUMMARY

As a part of developing embodiments herein a problem was identified by the inventors and will first be discussed.

The benefits of channel estimate aggregation and prediction relies on that the transmitter and receiver have a common stable phase reference. If not, the phase of the wireless channel estimates will fluctuate randomly between consecutive samples which will destroy the performance of all state-of-the-art methods. Unfortunately, the relevant 3GPP standards such as 3G, 4G, 5G, only guarantee that the UE transmissions are phase coherent within a slot. Phase coherence is very difficult to maintain when the UE changes its transmission power level, modulation format, or transmission beam, and hence wireless standards do not impose any requirements of phase coherency between slots.

It is assumed that costly hardware in the form of calibration loops would be needed to be added to address this issue, and no such coherent UEs are known to exist in the market.

An object of embodiments herein is to improve the performance of wireless channels in a wireless communications network.

According to an aspect of embodiments herein, the object is achieved by a method performed by a first node for adjusting channel coefficients of a wireless channel between the first node and a second node in a wireless communications network. The first node obtains a calculated current correlation value between the first channel coefficients estimated in a first time instant, and the second channel coefficients estimated in a second time instant, that is subsequent to the first time instant. The first node obtains a previous correlation value calculated at a previous time instant. The first node determines a phase adjustment value based on an estimated phase difference to be applied to the estimated second channel coefficients associated with the wireless channel. The phase difference is estimated between the current correlation value and the previous correlation value.

According to another aspect of embodiments herein, the object is achieved by a first node configured to adjust channel coefficients of a wireless channel between the first node and a second node in a wireless communications network. The first node further being configured to:

Obtain a calculated current correlation value between the first channel coefficients estimated in a first time instant, and the second channel coefficients estimated in a second time instant, that is subsequent to the first time instant, obtain a previous correlation value calculated at a previous time instant, and determine a phase adjustment value based on an estimated phase difference to be applied to the estimated second channel coefficients associated with the wireless channel, which phase difference is adapted to be estimated between the current correlation value and the previous correlation value.

In this way, embodiments herein achieve much longer-term phase stability of channel estimates of the wireless channel than prior art solutions, which will enable coherent processing over longer time periods, e.g. multiple slots. The increased time coherence will allow better channel estimation and channel prediction as known in the state of the art. This in turn results in improved performance of the wireless channels in a wireless communications network.

BRIEF DESCRIPTION OF THE DRAWINGS

Examples of embodiments herein are described in more detail with reference to attached drawings in which:

FIG. 2 is a flowchart depicting an embodiment of a method in a first node.

FIGS. 12-15 are flowcharts illustrating methods implemented in a communication system including a host computer, a base station, and a user equipment.

DETAILED DESCRIPTION

Example of embodiments provide methods for SRS Calibration.

Embodiments herein may apply to a method at a receiver node in order to compensate for lack of time coherency at the transmitter node, and/or at the receiver node. The method is based on the fact that a second order statistics in the form of a time-correlation of the wireless channel varies very slowly and may even be considered to be stationary over shorter time intervals. Hence, random phase variations in the time-correlation of the estimated channel may be attributed to phase errors in the transmitter node or in the receiver node rather than variations in the wireless channel. The receiver node therefore estimates and compensates for these errors.

Embodiments herein relate to phase calibration and addresses the problem of calibration over time, which is based on channel estimates in consecutive time instants.

Embodiments herein provide the following advantages:

The calibration, also referred to as adjustment, is done on the receiver side, referred to as a receiver node, and may be completely transparent to the transmitter node, e.g. a UE. Therefore, there is no need for costly hardware changes in the UE, nor for future standard changes to enforce transmitter coherency. All existing UEs including legacy 3G, 4G, and 5G devices may be automatically supported.

Embodiments herein achieve much longer-term phase stability of channel estimates than prior art solutions, which will enable coherent processing over longer time periods, e.g. multiple slots. The increased time coherence will allow better channel estimation and channel prediction as known in the state of the art.

Embodiments herein is fairly straightforward to implement with limited implementation complexity.

Figure 1:
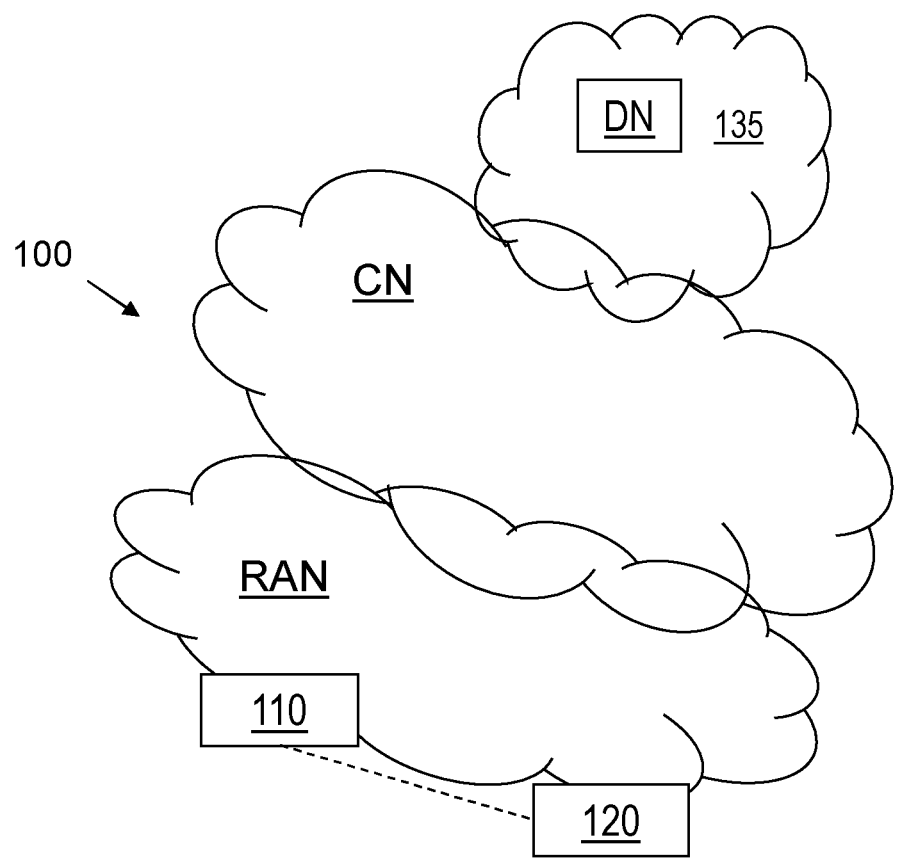
FIG. 1 is a schematic block diagram illustrating embodiments of a communications network.

FIG. 1 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of nodes operate in the wireless communications network 100 such as e.g. a first node 110 and a second node 120. These node may be able to communicate using a wireless channel between the first node 110 and the second node 120 in the wireless communications network 100.

The first node 110 and the second node 120 may each respectively be network nodes communicating with each other over the wireless channel. The first node 110 and the second node 120 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating over a wireless channel with the other respective first or second node 110, 120.

In some embodiments the first node 110 is a base station and the second node 120 is a UE. In some other embodiments it is the other way around, the first node 110 is a UE and the second node 120 is a base station. The first node 110 may be referred to as a receiver of reference symbols and the second node 120 may be referred to as a transmitter of the reference symbols.

Any one or more out of the first node 110 and second node 120 may in some embodiments be represented by a UE in the wireless communication network 100. A UE when used herein may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

In some embodiments, the first node 110 is represented by a network node as described above and the second node 120 is represented by a UE as described above. In some other embodiments, the first node 110 is represented by a network node as described above and the second node 120 is represented by a network node as described above. In some other embodiments, the first node 110 is represented by a network node as described above and the second node 120 is represented by a UE as described above. In some other embodiments, the first node 110 is represented by a UE and the second node 120 is represented by a network node as described above.

Methods herein may be performed by the first node 110. As an alternative, a Distributed Node (DN) and functionality, e.g. comprised in a cloud 135 as shown in FIG. 1, may be used for performing or partly performing the methods herein.

According to example embodiments herein, the first node 110 adjusts, e.g. calibrates, channel coefficients that characterize a wireless channel between the first node 110 and the second node 120, to compensate for lack of first node 110 and/or second node 120 coherence by utilizing a previous correlation value, also referred to as second order statistics, of the fast fading variations in time related to the wireless channel.

A number of embodiments will now be described, some of which may be seen as alternatives, while some may be used in combination.

FIG. 2 shows example embodiments of a method performed by the first node 110 for adjusting channel coefficients of a wireless channel between the first node 110 and the second node 120 in the wireless communications network 100. Channel coefficients when used herein means the relation between the transmitted and received signals which may be characterized by a time-, frequency-, and antenna-dependent amplitude and phase. The method comprises the following actions, which actions may be taken in any suitable order. Optional actions are referred to as dashed boxes in FIG. 2.

Action 201

In some embodiments, the first node 110 obtains first channel coefficients associated with the wireless channel. The first channel coefficients are estimated at a first time instant. The first time instant is also referred to as the previous time or previous time instant. The first channel coefficients may be obtained by the first node 110 estimating them or receiving them from another node.

Action 202

In some embodiments, the first node 110 obtains second channel coefficients associated with the wireless channel. The second channel coefficients are estimated at a second time instant, that is subsequent to the first time instant. The second time instant is also referred to as the present time or present time instant. The second channel coefficients may be obtained by the first node 110 estimating them or receives them from another node.

In some embodiments, any one or more out of the first channel coefficients and the second channel coefficients, comprise respective channel coefficients for different frequencies and/or antenna ports. This means that for each time instant channel coefficient statistics are available for multiple frequencies and/or antenna ports.

In some embodiments, a delay domain representation of the first channel coefficients and the second channel coefficients is obtained by an inverse Fourier transform with respect to the frequency. This is to enable delay domain filtering of the channel which is known in the state of the art as a method to improve the SNR of the channel estimates by concentrating the energy of the desired signal to fewer coefficients while noise energy continues to be spread over all coefficients. Different coefficients in the delay domain representation of the channel represent different multipath components with different relative delays or propagation path lengths.

In some embodiments, the channel coefficients in the delay domain representation of the channel to use for correlation calculation are determined by considering channel coefficients for which the relative delay in $\hat{H}(\tau, t, r_t, r_r)$ and $\hat{H}(\tau, t+\Delta t, r_t, r_r)$, have not changed substantially. This is to preserve the parts of the channel that exists in both time instances and improves the correlation estimation quality Multipath components when used herein means channel taps in the time domain representation of the channel.

Signal components when used herein means channel taps in the time domain representation of the channel.

Relative delay when used herein means delay relative to the main time domain channel tap.

Action 203

The first node 110 then obtains a calculated current correlation value between the first channel coefficients estimated in the first time instant, and the second channel coefficients estimated in the second time instant, that is subsequent to the first time instant. The calculated current correlation value may be obtained by estimating them or receiving them from another node such as e.g. a node dedicated for correlation calculation, or a database storing the correlation values.

A correlation value when used herein may also comprise a covariance value, and means an amplitude and a phase representing the correlation or the covariance between the channels at the two time instances. Correlation and covariance only differ in amplitude which is not important here.

In some embodiments, the obtaining of the calculated current correlation value is calculated by using only a subset of delay domain channel coefficients for which either:
A) the relative delay between the first channel coefficients and the second channel coefficients have not changed above a threshold, or
B) the delays of the channel coefficients correspond to delays expected and derived form a digital representation of the environment.

Have not changed above a threshold means have not changed substantially. The threshold may be predetermined to reflect the limit what is meant by having not changed substantially.

Delays expected and derived form a digital representation of the environment means geometric calculations based on known reflectors in the environment and corresponding path distances Action 204

The first node 110 obtains a previous correlation value calculated at a previous time instant. The previous correlation value may e.g. be obtained by estimating them based on at least one channel coefficients previous to the first channel coefficients or receiving them from another node, such as e.g. a node dedicated for correlation calculation, or a database storing the correlation values.

Action 205

The first node 110 may estimate a phase difference between the current correlation value and the previous correlation value. This is to establish a phase adjustment value based on said phase difference.

Action 206

The first node 110 then determines a phase adjustment value based on the estimated phase difference. The phase adjustment value is to be applied to the estimated second channel coefficients associated with the wireless channel. The phase difference is estimated between the current correlation value and the previous correlation value.

The phase adjustment value may be applied to the estimated second channel coefficients by adding the phase adjustment value to the phase values of the estimated second channel coefficients.

In this way, the second channel coefficients become adjusted for phase coherence with previous channel coefficients.

Action 207

In some embodiments, the first node 110 then applies the phase adjustment value to the estimated second channel coefficients associated with the wireless channel.

In some embodiments, the applied the phase adjustment value to the estimated second channel coefficients associated with the wireless channel is used to anyone or more out of:
improving estimation of the wireless channel,
predicting the wireless channel at a later time instance,
correcting past channel coefficient logs stored in databases In this way, embodiments herein achieve much longer-term phase stability of channel estimates than prior art solutions, which will enable coherent processing over longer time periods, e.g. multiple slots. The increased time coherence will allow better channel estimation and channel prediction as known in the state of the art.

The above embodiments will now be further explained and exemplified below. The embodiments below may be combined with any suitable embodiment above.

A wireless channel characterizes a relation between transmitted and received signals, in this example between the first node 110 and the second node 120. A common model for a wireless channel H is based on a superposition of multiple propagation paths between the transmitter and the receiver. The model describing the wireless channel is thus denoted H. The complex amplitude of the wireless channel H may be a function H(f, t, $r_t$, $r_r$) of:
a specific Transmitter (Tx) antenna position referred to as $r_t$,
a specific Receiver (Rx) antenna position referred to as $r_r$,
a time instant referred to as t, and
a frequency referred to as f.

Figure 3:
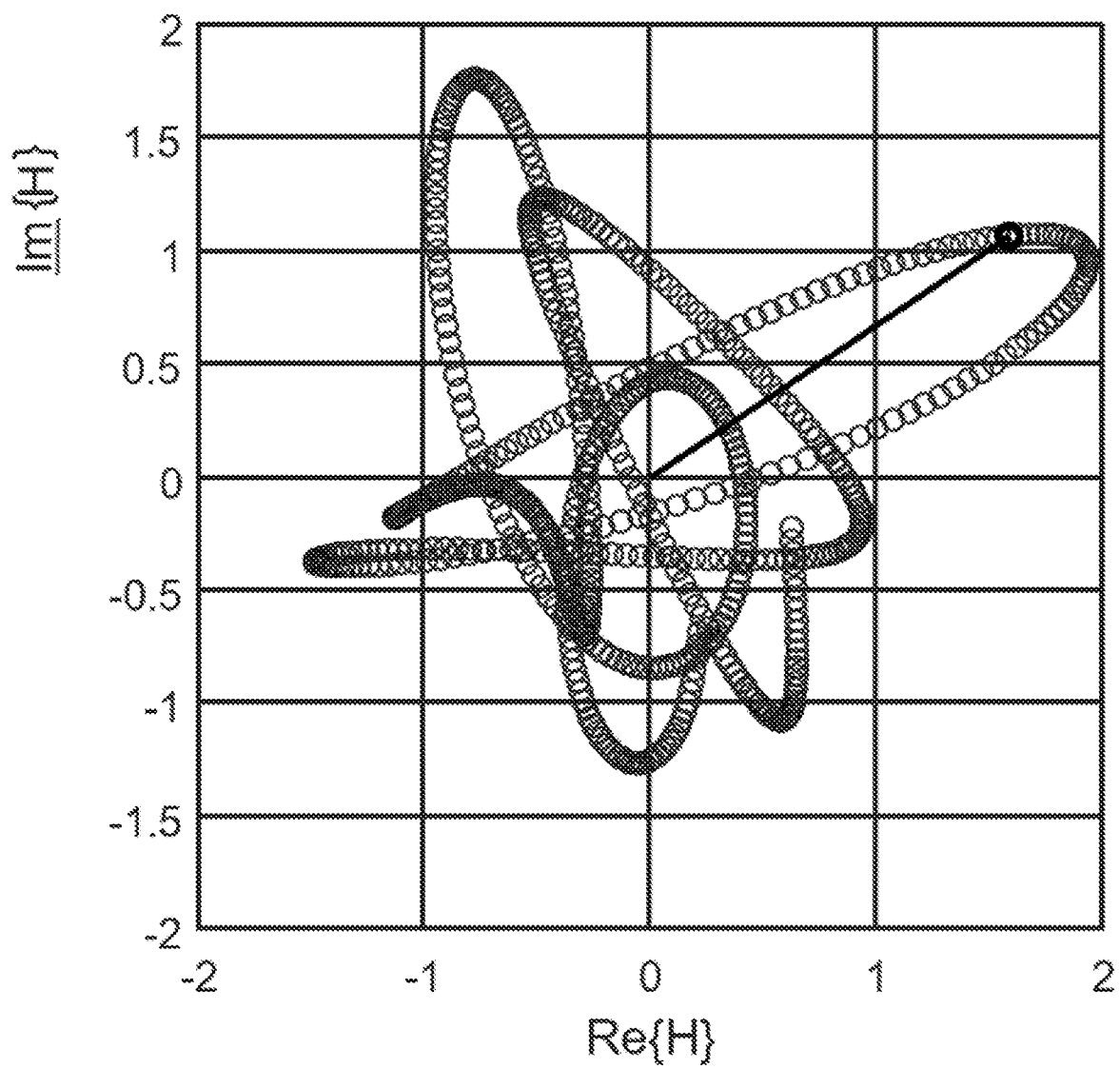
FIG. 3 is a chart illustrating a wireless channel.

Due to that the wireless channel comprises a superposition of multiple propagation paths, the complex amplitude of the wireless channel H will vary rapidly in each of these dimensions. These variations are commonly referred to as fast-fading, and are exemplified for a rich multipath wireless channel in FIGS. 4-6 wherein:

FIG. 3 depicts fast fading of the complex amplitude of the wireless channel H.

Figure 4:
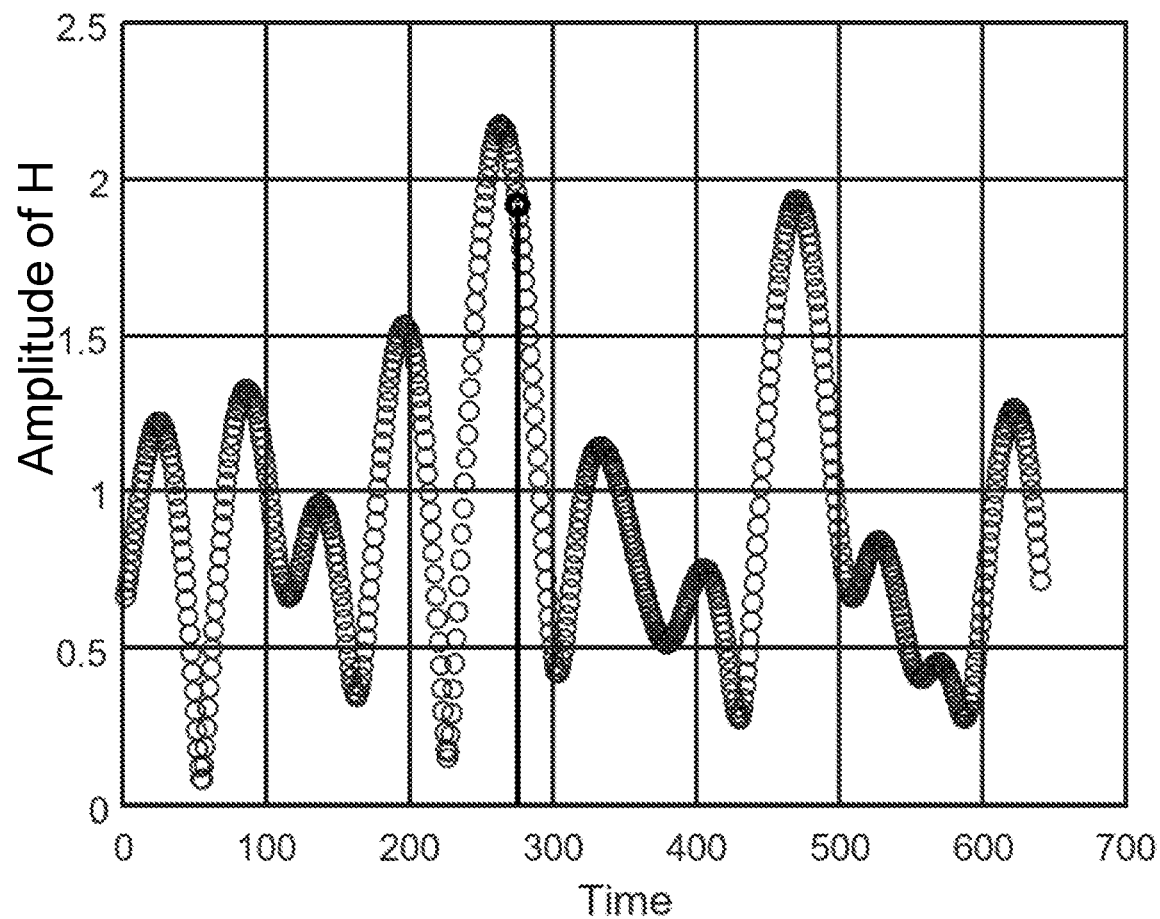
FIG. 4 is a diagram illustrating a wireless channel.

FIG. 4 depicts the amplitude of the fast-fading wireless channel, i.e. the magnitude of H.

Figure 5:
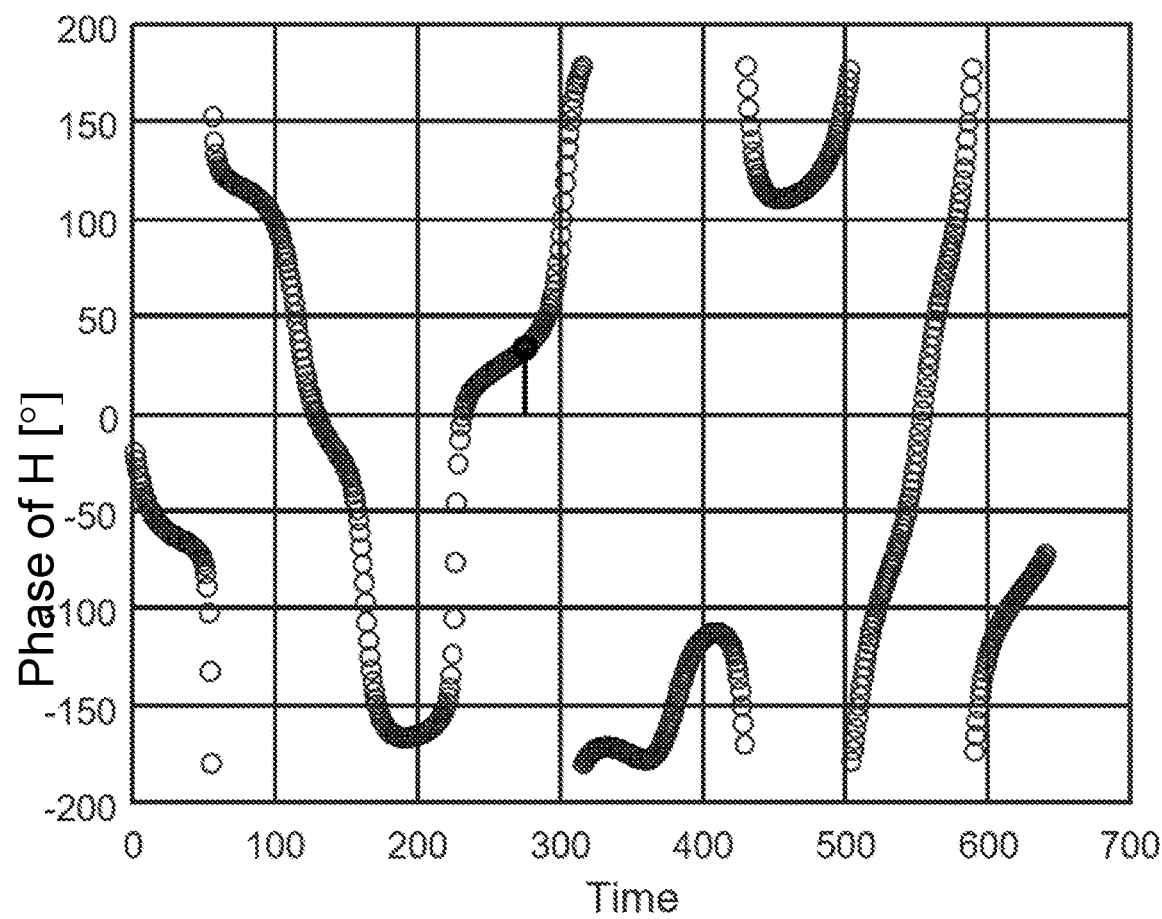
FIG. 5 is a diagram illustrating a wireless channel.

FIG. 5 depicts the phase of the fast-fading radio channel, i.e. the phase of H.

As can be seen in FIG. 5, the rate of change of the phase variations of the channel is rapidly varying.

The time autocorrelation denoted $R_H$, may be described as $R_H(t, t+\Delta t)$ of H and is an example of a second order statistics. It may be defined as $$R_H(t, t+\Delta t) = E\{H(\ldots, t, \ldots)H(\ldots, t+\Delta t, \ldots)^*\}$$

where t denotes the first time instant for the first channel coefficients,
where t+Δt denotes the second time instant for the second channel coefficients,
where E{ } denotes an expectation operator, an expectation operator is a notation for calculation of the expected value of a stochastic variable, and
where H* denotes a complex conjugate of H.

It may be shown that $R_H(t, t+\Delta t)$ is independent of t for a particular class of wireless channels that are Wide-Sense Stationary with Uncorrelated Scattering (WSSUS). This means that the directions and strengths of the multipath components of the wireless channel are static. Most real-world channels are not WSSUS, but they may be well approximated by WSSUS if the movement of the first node 110 or the second node 120 is confined to a local area so that the eventual variations of the multipath due to changing directions or strength are very small. The size of this local area where such an approximation holds is dependent on the propagation environment but may in many cases be several meters wide. For typical mobile user, such as first node 110 and second node 120, speeds in a wireless communication system this means that the time autocorrelation may be approximated as being constant for fractions of a second to several seconds. This time is much longer than the typical coherence time of UE, such as any of the first node 110 and/or the second node 120, transmissions which are only guaranteed to be coherent within e.g. a few milli seconds (ms).

In systems such as LTE and NR, the receiver such as e.g. the first node 110 which may be a base station, forms estimates Ĥ(f, t, r$_t$, r$_r$) of the wireless channel by comparing the received signal with a known transmitted signal.

These estimates will be affected by additive noise and estimation errors σ(t), but also of an eventual time-varying phase error θ(t) due to non-coherent transmissions, i.e.:

$$\hat{H}(f, t, r_t, r_r) = e^{i\theta(t)} H(f, t, r_t, r_r) + \sigma(t)$$

Assuming that the noise is statistically independent in different time instants, i.e, that E{σ(t)σ(t+Δt)*}=0, the time autocorrelation of Ĥ becomes $$R_{\hat{H}}(t, t+\Delta t) = E\{\hat{H}(\ldots, t, \ldots)\hat{H}(\ldots, t+\Delta t, \ldots)^*\} = R_H(\Delta t)e^{i(\theta(t)-\theta(t+\Delta t))}$$

So even if the true channel autocorrelation R$_H$ is independent of time, the autocorrelation of the estimated channel is time-dependent due to the time-varying phase error. Consecutive estimates of R$_{\hat{H}}$(t, t+Δt) may therefore be used to estimate the time-varying phase error θ(t) in an iterative process. This forms the basis of the embodiments herein. This relates to Action 205 mentioned above.

As can be seen above, determining the autocorrelation R$_H$ or R$_{\hat{H}}$ requires a calculation of an expectation value. In practice, the expectation value E{xy*} is estimated based on a finite set of N observations by using the arithmetic mean as $$E\{xy^*\} \approx \frac{1}{N}\sum_{n=1}^{N} x_n y_n^*.$$

The more independent observations of Ĥ, the better this estimate becomes. In some embodiments, channel coefficients for different frequencies and antenna ports are used as different such observations. E.g. if the channel is estimated for L frequency subcarriers, M transmit antennas, and N receive antennas, then the autocorrelation may be estimated as $$R_{\hat{H}}(t, t+\Delta t) = \sum_{l=1}^{L}\sum_{m=1}^{M}\sum_{n=1}^{N} \hat{H}_{lmn}(t)\hat{H}_{lmn}^*(t+\Delta t)$$

where Ĥ$_{lmn}$(t) is the channel estimate for the l:th subcarrier of the wireless channel, the m:th transmit antenna, and the n:th receive antenna.

In some embodiments, the receiver calculates the time autocorrelation between the channel estimates in the current time instant and the channel estimates in a previous instant, R$_{\hat{H},n}$(t$_{n-1}$, t$_n$). This correlation is compared with the previous estimate of the autocorrelation, R$_{\hat{H},n-1}$(t$_{n-2}$, t$_{n-1}$), and an estimate of the phase error between these two time instants is determined as $$\Delta\hat{\theta}(t_n) = \arg(R_{\hat{H},n}(t_{n-1}, t_n) / R_{\hat{H},n-1}(t_{n-2}, t_{n-1}))$$

This estimated phase error can be used to compensate the channel estimates at t$_n$ by $$\hat{H}_{lmn,calibrated}(t_n) = e^{-i\Delta\hat{\theta}(t_n)} \hat{H}_{lmn}(t_n)$$

By consecutively calculating the autocorrelation and compensating the channel estimates as time progresses it is therefore possible to achieve coherency over longer time periods. This relates to Action 206 and 207 mentioned above.

Figure 6:
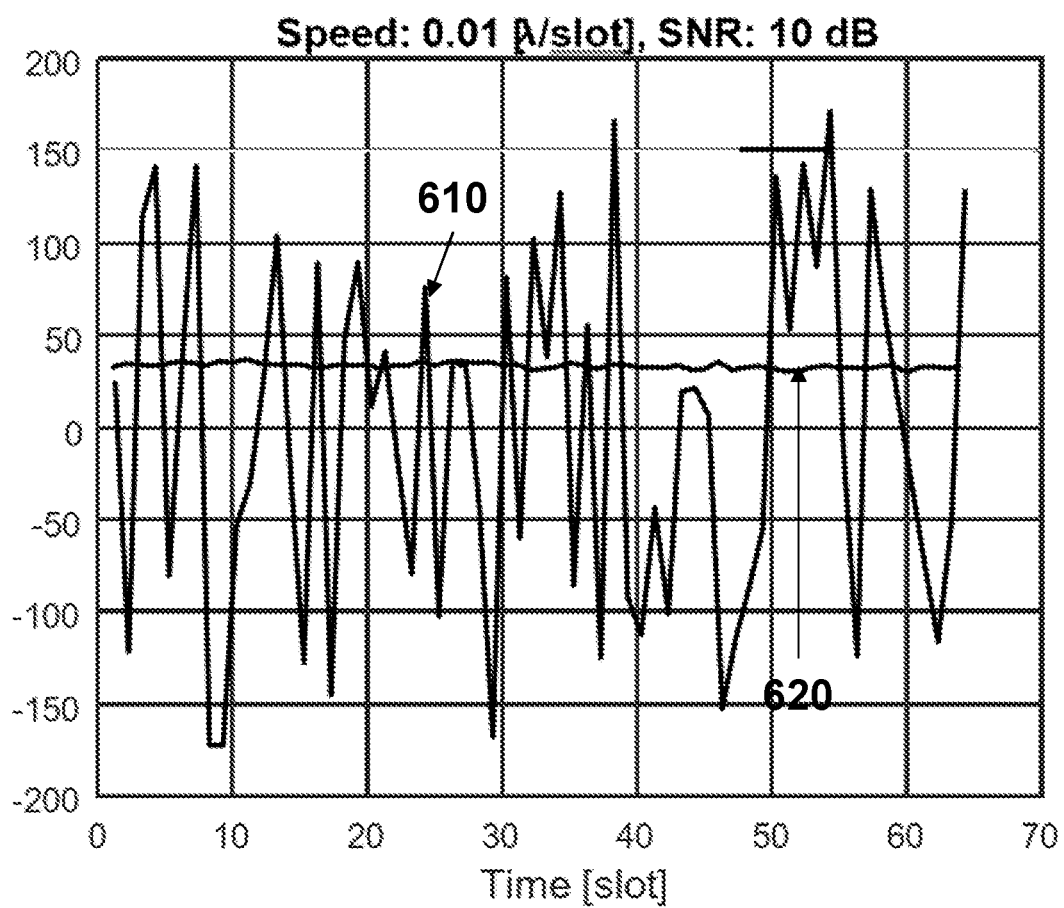
FIG. 6 is a diagram illustrating a wireless channel.

An example of the phase error in Ĥ$_{lmn}$(t) (blue) and in Ĥ$_{lmn,calibrated}$(t) (red) is shown in FIG. 6. FIG. 6 depicts Phase error 610 and residual phase error 620 after applying embodiments herein. The example uses an SNR per channel estimate of 10 dB, and N·L·M=64 channel estimates per time instant. As can be seen, embodiments herein are able to almost completely remove the random phase variations.

In some additional embodiments, a delay-time domain filtering of Ĥ(τ, t, r$_t$, r$_r$), e.g. obtained through performing a frequency-delay inverse Fourier transform with respect to f of Ĥ(f, t, r$_t$, r$_r$) for each t, prior to the autocorrelation calculation. The filtering is performed by using only a subset of the channel coefficients in Ĥ(τ, t, r$_t$, r$_r$) and Ĥ(t, t+Δt, r$_t$, r$_r$), these being channel coefficients corresponding to delays representing multipath propagations resulting from (line of sight) LoS propagation of reflections/scattering of fixed objects in the environment, such as for example buildings.

Figure 7:
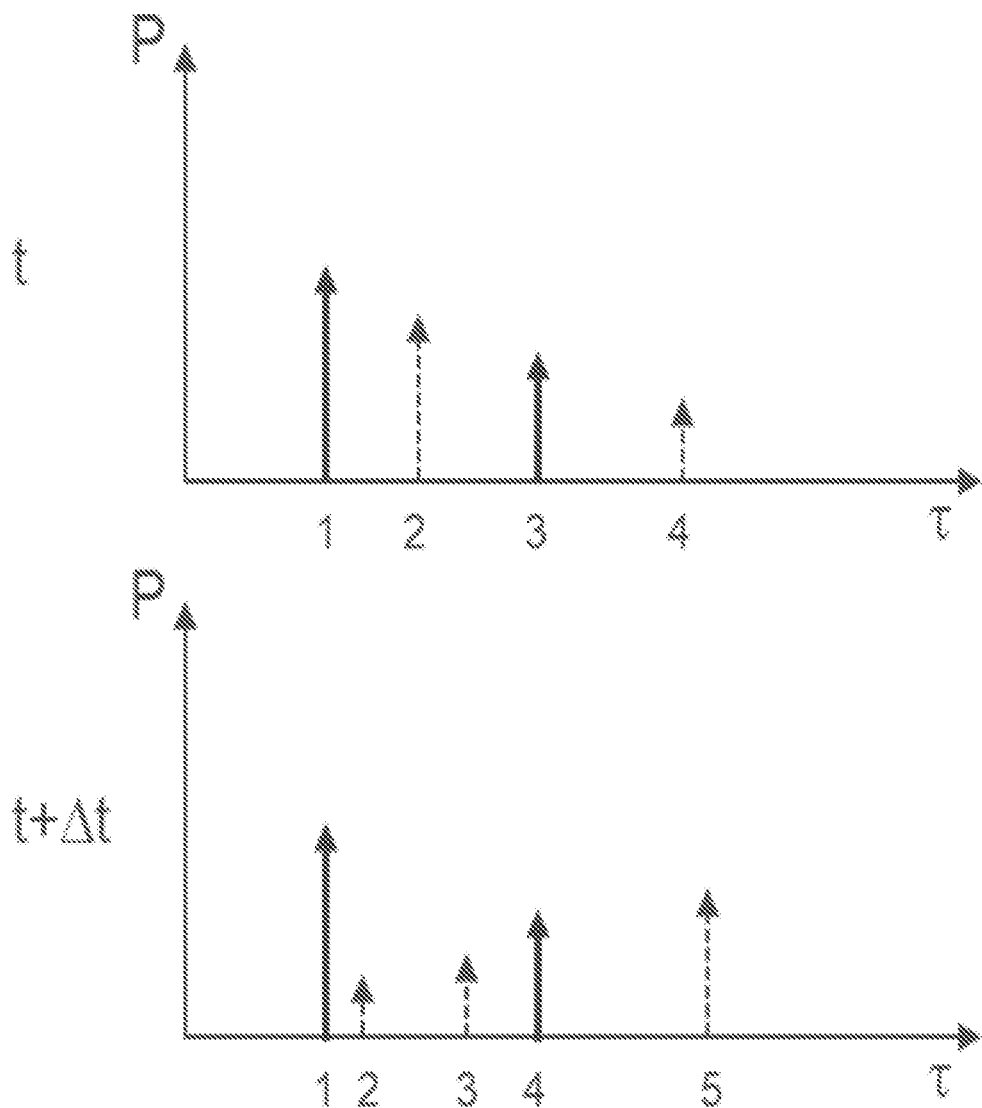
FIG. 7 is a diagram illustrating embodiments herein.

In an additional embodiment, the channel coefficients to use are those for which the relative delay in Ĥ(τ, t, r$_t$, r$_r$) and Ĥ(τ, t+Δt, r$_t$, r$_r$), have not changed substantially. An example of the Time delay filter is illustrated in FIG. 7.

In the example, delays 1 and 3 will be kept for Ĥ( . . . , t, . . . ) and delays 1 and 4 for Ĥ( . . . , t+Δt, . . . ). This is since they represent the wide-sense stationary parts of the channel.

In an alternative dependent embodiment, the channel coefficients to use may be determined by considering delays in Ĥ( . . . , t, . . . ) that correspond to delays expected and derived form a digital representation of the environment. An example of such would be a 3D map of a city where the first node 110 and the second node 120, e.g. a UE and a base station, are located.

In an additional embodiment, a time domain representation of Ĥ(t, t, r$_t$, r$_r$) is obtained by an inverse Fourier transform of Ĥ(f, t, r$_t$, r$_r$) in frequency domain.

Figure 8:
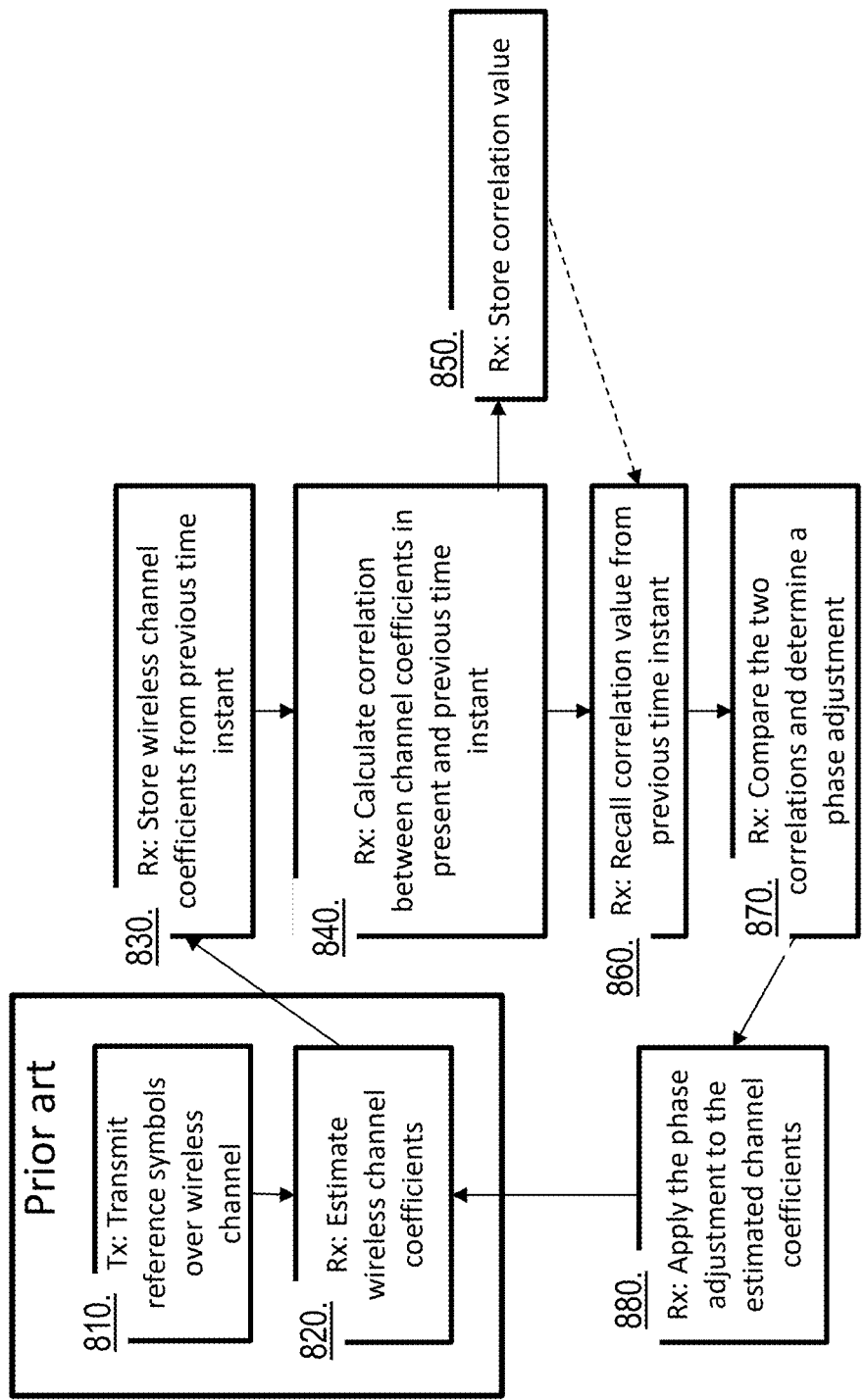
FIG. 8 is a flowchart depicting embodiments herein.

I,e. $\hat{H}(f, t, r_t, r_r) \rightarrow \hat{H}(\tau, t, r_t, r_r) \rightarrow$ filtering $\rightarrow \overline{H}_{r}(\tau, t, r_t, r_r) \rightarrow \overline{H}_{r}(f, t, r_t, r_r)$ FIG. 8 illustrates a flowchart of steps of an example of embodiments herein.

Action 810. The first node 110 transmits reference symbols over the wireless channel.

Action 820. The first node 110 estimates current OK? wireless channel coefficients. This relates to Action 202 described above.

Action 830. The first node 110 stores channel coefficients, also referred to as wireless channel coefficients from previous time, also referred to as first time instant. This relates to Action 201 described above.

Action 840. The first node 110 calculates correlation value between wireless channel coefficients in previous time also referred to as first time instant, and present time, also referred to as second time instant. This relates to Action 204 described above.

Action 850. The first node 110 stores the calculated correlation value.

Action 860. The first node 110 recalls a correlation value from previous time also referred to as first time instant.

Action 870. The first node 110 then compare the two correlations and determine phase adjustment. This relates to Action 205 and 206 described above.

Action 880. The first node 110 applies the determined phase adjustment to the estimated channel coefficients. This relates to Action 207 described above.

To perform the method actions above, the first node 110 is configured to adjust channel coefficients of a wireless channel between the first node 110 and a second node 120 in a wireless communications network 100. The first node 110 may comprise an arrangement depicted in FIGS. 9a and 9b.

The first node 110 may comprise an input and output interface 900 configured to communicate with other nodes, e.g. network nodes and/or UEs, such as the second node 120. The input and output interface 900 may comprise a wireless receiver (not shown) and a wireless transmitter (not shown).

The first node 110 may further be configured to, e.g. by means of an obtaining unit 910 in the first node 110, obtain a calculated current correlation value between the first channel coefficients estimated in a first time instant, and the second channel coefficients estimated in a second time instant, that is subsequent to the first time instant.

The first node 110 may further be configured to, e.g. by means of the obtaining unit 910 in the first node 110, obtain a previous correlation value calculated at a previous time instant.

The first node 110 may further be configured to, e.g. by means of the obtaining unit 910 in the first node 110, obtain the first channel coefficients associated with the wireless channel, adapted to be estimated at the first time instant.

The first node 110 may further be configured to, e.g. by means of the obtaining unit 910 in the first node 110, obtain second channel coefficients associated with the wireless channel, adapted to be estimated at a second time instant that is subsequent to the first time instant.

The first node 110 may further be configured to, e.g. by means of a determining unit 920 in the first node 110, determine a phase adjustment value based on an estimated phase difference to be applied to the estimated second channel coefficients associated with the wireless channel. The phase difference may be adapted to be estimated between the current correlation value and the previous correlation value.

The first node 110 may further be configured to, e.g. by means of an estimating unit 930 in the first node 110, estimate a phase difference between the current correlation value and the previous correlation value.

The first node 110 may further be configured to, e.g. by means of an applying unit 940 in the first node 110, apply the phase adjustment value to the estimated second channel coefficients associated with the wireless channel.

In some embodiments, the phase adjustment value applied to the estimated second channel coefficients associated with the wireless channel is adapted to be used to anyone or more out of:
improving estimation of the wireless channel,
predicting the wireless channel at a later time instance,
correcting past channel coefficient logs stored in databases.

In some embodiments, any one or more out of the first channel coefficients and the second channel coefficients, are adapted to comprise respective channel coefficients for different frequencies and/or antenna ports.

In some embodiments, the calculated current correlation value is calculated by using only a subset of delay domain channel coefficients for which either:
A) the relative delay between the first channel coefficients and the second channel coefficients have not changed above a threshold, or
B) the delays of the channel coefficients correspond to delays expected and derived form a digital representation of the environment. In some embodiments, a delay domain representation of the first channel coefficients and the second channel coefficients is adapted to be obtained by an inverse Fourier transform with respect to the frequency.

Figure 9A:
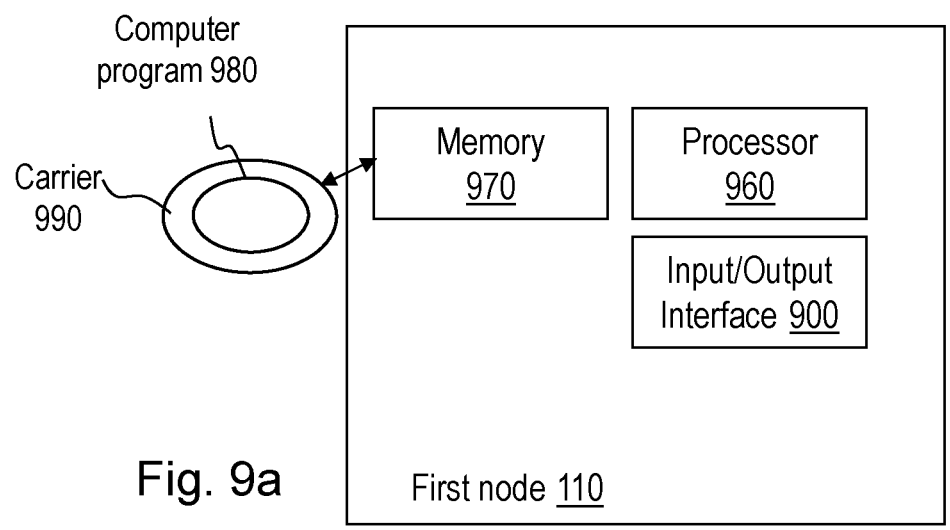
FIG. 9a-b are schematic block diagrams illustrating embodiments of a function node.
Figure 9B:
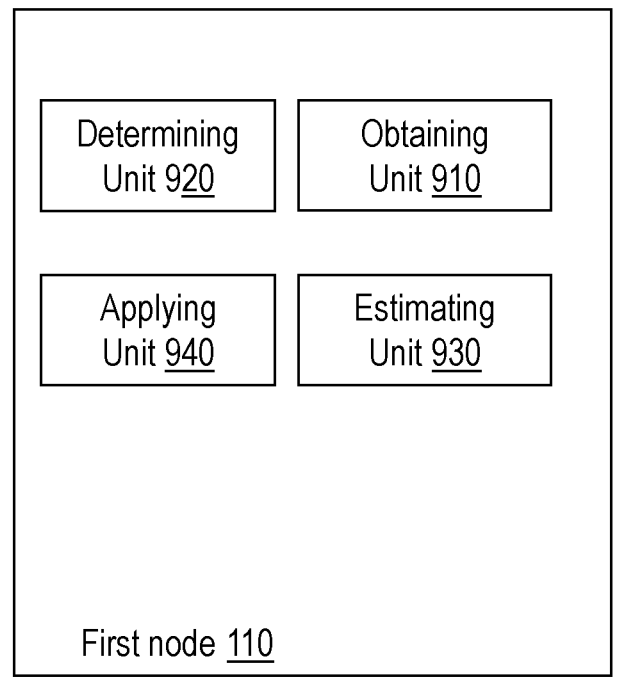

The embodiments herein may be implemented through a respective processor or one or more processors, such as the processor 960 of a processing circuitry in the first node 110 depicted in FIG. 9a, together with respective computer program code for performing the functions and actions of the embodiments herein. The program code mentioned above may also be provided as a computer program product, for instance in the form of a data carrier carrying computer program code for performing the embodiments herein when being loaded into the first node 110. One such carrier may be in the form of a CD ROM disc. It is however feasible with other data carriers such as a memory stick. The computer program code may furthermore be provided as pure program code on a server and downloaded to the first node 110.

The first node 110 may further comprise a memory 970 comprising one or more memory units. The memory 970 comprises instructions executable by the processor in first node 110. The memory 970 is arranged to be used to store e.g. information, indications, data, configurations, and applications to perform the methods herein when being executed in the first node 110.

In some embodiments, a computer program 980 comprises instructions, which when executed by the respective at least one processor 960, cause the at least one processor of the first node 110 to perform the actions above.

In some embodiments, a respective carrier 990 comprises the respective computer program 980, wherein the carrier 990 is one of an electronic signal, an optical signal, an electromagnetic signal, a magnetic signal, an electric signal, a radio signal, a microwave signal, or a computer-readable storage medium.

Those skilled in the art will appreciate that the units in the first node 110 described above may refer to a combination of analog and digital circuits, and/or one or more processors configured with software and/or firmware, e.g. stored in the first node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 10:
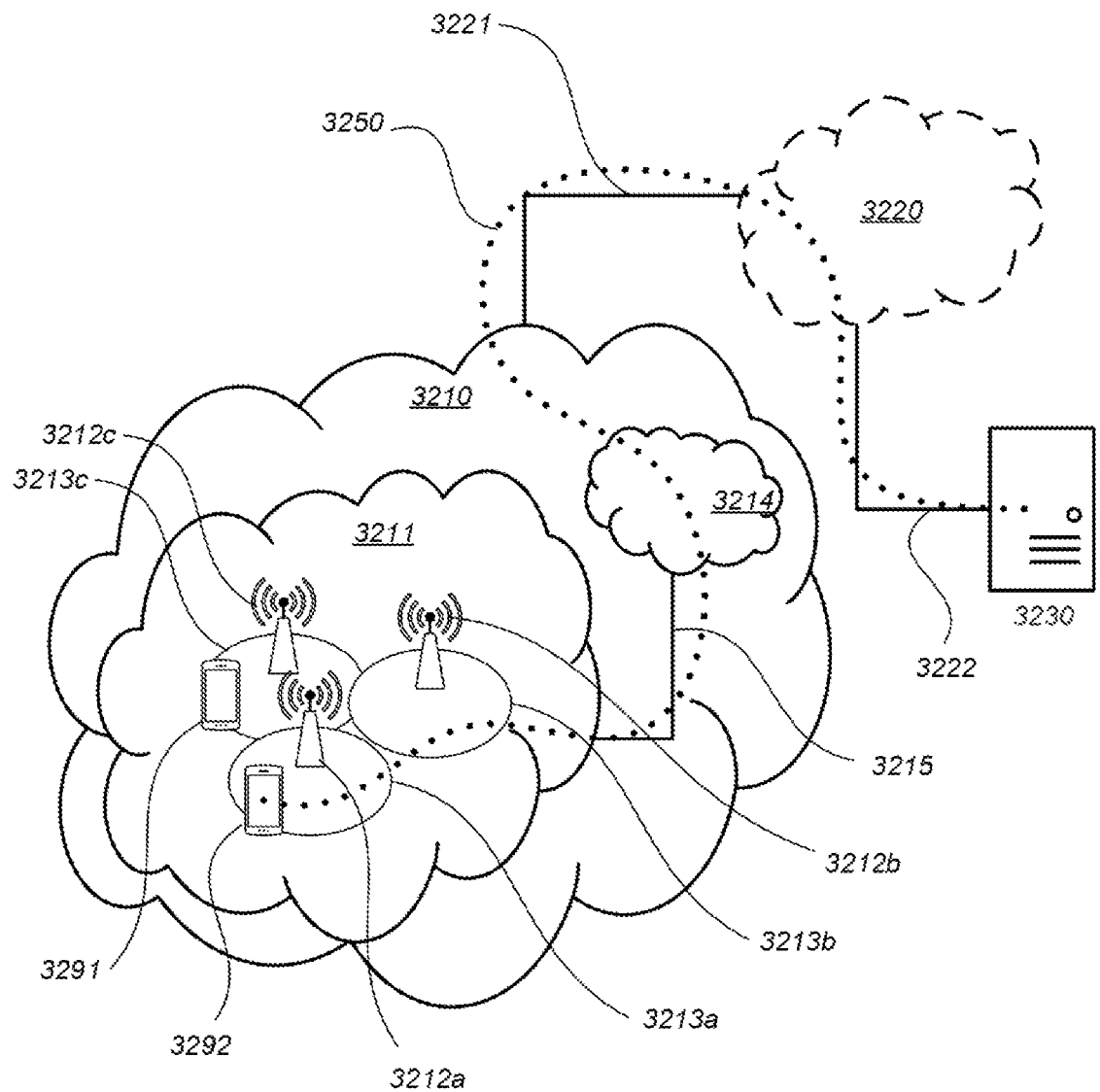
FIG. 10 schematically illustrates a telecommunication network connected via an intermediate network to a host computer.

With reference to FIG. 10, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as e.g., the first node 110 and/or the second node 120, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first UE e.g., the first node 110 and/or the second node 120, such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
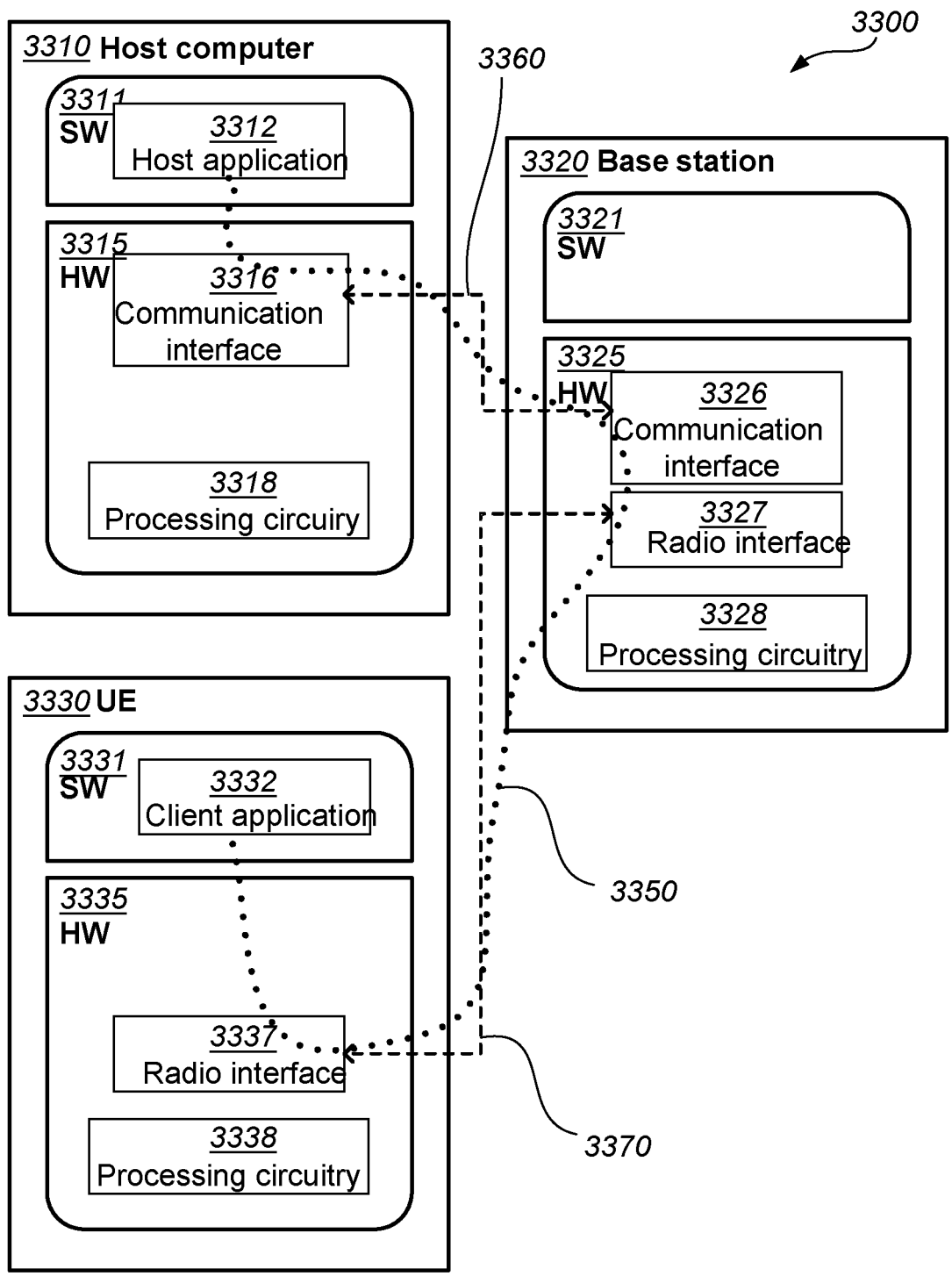
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station such as e.g. the first node 120, and a UE such as e.g. the second node 120, which may be those described with reference to FIG. 10 and FIG. 11. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described embodiments. Various alternatives, modifications and equivalents may be used.

The invention claimed is:

1. A method performed by a first node for adjusting channel coefficients of a wireless channel between the first node and a second node in a wireless communications network, the method comprising:
   obtaining a calculated current correlation value between first channel coefficients estimated in a first time instant, and second channel coefficients estimated in a second time instant that is subsequent to the first time instant,
   obtaining a previous correlation value calculated at a previous time instant, and
   determining a phase adjustment value based on an estimated phase difference to be applied to the estimated second channel coefficients associated with the wireless channel, which phase difference is estimated between the calculated current correlation value and the previous correlation value.

2. The method according to claim 1, further comprising any one or more out of:
   obtaining the first channel coefficients associated with the wireless channel, estimated at the first time instant,
   obtaining the second channel coefficients associated with the wireless channel, estimated at the second time instant, that is subsequent to the first time instant,
   estimating a phase difference between the current correlation value and the previous correlation value.

3. The method according to claim 1, further comprising:
   applying the phase adjustment value to the estimated second channel coefficients associated with the wireless channel.

4. The method according to claim 1, wherein the applying the phase adjustment value to the estimated second channel coefficients associated with the wireless channel is used to anyone or more out of:
   improving estimation of the wireless channel,
   predicting the wireless channel at a later time instance,
   correcting past channel coefficient logs stored in databases.

5. The method according to claim 1, wherein any one or more out of the first channel coefficients and the second channel coefficients, comprise respective channel coefficients for different frequencies and/or antenna ports.

6. The method according to claim 1, wherein a delay domain representation of the first channel coefficients and the second channel coefficients is obtained by an inverse Fourier transform with respect to the frequency.

7. The method according to claim 6, wherein obtaining the calculated current correlation value is calculated by using only a subset of delay domain channel coefficients for which either:
   A) the relative delay between the first channel coefficients and the second channel coefficients have not changed above a threshold, or
   B) the delays of the channel coefficients correspond to delays expected and derived form a digital representation of the environment.

8. A non-transitory computer-readable storage medium comprising instructions, which when executed by a processor, causes the processor to:
   obtain a calculated current correlation value between first channel coefficients estimated in a first time instant, and second channel coefficients estimated in a second time instant that is subsequent to the first time instant,
   obtain a previous correlation value calculated at a previous time instant, and
   determine a phase adjustment value based on an estimated phase difference to be applied to the estimated second channel coefficients associated with a wireless channel, which phase difference is estimated between the calculated current correlation value and the previous correlation value.

9. A first node configured to adjust channel coefficients of a wireless channel between the first node and a second node in a wireless communications network, the first node further being configured to:
   obtain a calculated current correlation value between first channel coefficients estimated in a first time instant, and second channel coefficients estimated in a second time instant, that is subsequent to the first time instant,
   obtain a previous correlation value calculated at a previous time instant, and
   determine a phase adjustment value based on an estimated phase difference to be applied to the estimated second channel coefficients associated with the wireless channel, which phase difference is adapted to be estimated between the calculated current correlation value and the previous correlation value.

10. The first node according to claim 9, further being configured to any one or more out of:
    obtain the first channel coefficients associated with the wireless channel, adapted to be estimated at the first time instant,
    obtain the second channel coefficients associated with the wireless channel, adapted to be estimated at the second time instant that is subsequent to the first time instant, and
    estimate a phase difference between the calculated current correlation value and the previous correlation value.

11. The first node according to claim 9, further being configured to:
    apply the phase adjustment value to the estimated second channel coefficients associated with the wireless channel.

12. The first node according to claim 9, wherein the phase adjustment value applied to the estimated second channel coefficients associated with the wireless channel is adapted to be used to anyone or more out of:
    improving estimation of the wireless channel,
    predicting the wireless channel at a later time instance,
    correcting past channel coefficient logs stored in databases.

13. The first node according to claim 9, wherein any one or more out of the first channel coefficients and the second channel coefficients, are adapted to comprise respective channel coefficients for different frequencies and/or antenna ports.

14. The first node according to claim 9, wherein a delay domain representation of the first channel coefficients and the second channel coefficients is adapted to be obtained by an inverse Fourier transform with respect to frequency.

15. The first node according to claim 14, wherein the calculated current correlation value is calculated by using only a subset of delay domain channel coefficients for which either:

A) the relative delay between the first channel coefficients and the second channel coefficients have not changed above a threshold, or
B) the delays of the channel coefficients correspond to delays expected and derived from a digital representation of the environment.

* * * * *